(12) United States Patent
Stenvik

(10) Patent No.: US 12,434,920 B2
(45) Date of Patent: Oct. 7, 2025

(54) METHOD AND PRODUCTION LINE FOR SEPARATING CONJOINED PRODUCTS

(71) Applicant: General Mills, Inc., Minneapolis, MN (US)

(72) Inventor: Ralph A. Stenvik, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 153 days.

(21) Appl. No.: 18/234,422

(22) Filed: Aug. 16, 2023

(65) Prior Publication Data

US 2025/0058980 A1 Feb. 20, 2025

(51) Int. Cl.
*B65G 47/88* (2006.01)
*B65G 59/10* (2006.01)

(52) U.S. Cl.
CPC .......... *B65G 47/88* (2013.01); *B65G 2201/02* (2013.01)

(58) Field of Classification Search
CPC .... B65G 47/88; B65G 47/8823; B65G 59/10; B65G 59/107
USPC ......... 414/795.6, 797.3, 797.7, 798.5, 798.9; 426/518
See application file for complete search history.

(56) References Cited

U.S. PATENT DOCUMENTS

| | | | | |
|---|---|---|---|---|
| 2,611,470 A | * | 9/1952 | Rudolph ................ | B65G 47/29 198/408 |
| 3,103,288 A | * | 9/1963 | Pruss ....................... | B60P 3/07 414/469 |
| 3,391,806 A | * | 7/1968 | Geis ........................ | B65H 5/002 414/796 |
| 3,602,358 A | * | 8/1971 | Jakobsson ............... | B28B 13/04 225/3 |
| 5,722,811 A | * | 3/1998 | Schum ..................... | B65H 3/14 414/796 |
| 6,079,939 A | * | 6/2000 | Smets ..................... | B65G 59/08 198/406 |
| 6,120,240 A | * | 9/2000 | Ghilardi ................. | B65H 45/28 198/419.3 |
| 6,146,087 A | * | 11/2000 | Perry ..................... | B65B 63/00 414/798.9 |
| 6,555,152 B1 | * | 4/2003 | Roso ........................ | A23G 4/04 425/316 |

* cited by examiner

*Primary Examiner* — Douglas A Hess
(74) *Attorney, Agent, or Firm* — Jordan IP Law, LLC; John L. Crimmins, Esq.

(57) ABSTRACT

A quality control apparatus employed in a production line for sticky products in roll form is effectively positioned following a product rolling operation and functions to assure that adjacent rolled products are not conjoined as the products proceed toward a packaging operation. The separating apparatus includes a holding mechanism and a breaking mechanism. During production of the rolled products, the products are directed to the apparatus whereat any conjoined products are automatically separated, with the holding mechanism maintaining a first one of the conjoined products in a first orientation while the breaking mechanism forces a second one of the conjoined products to be reorientated, basically pivoting the second conjoined product relative to the first product, which results in the conjoined products being broken apart. In one form, the apparatus is positioned to separate conjoined products at a transfer region of the products from an upper conveyor to a lower conveyor.

18 Claims, 4 Drawing Sheets

METHOD AND PRODUCTION LINE FOR SEPARATING CONJOINED PRODUCTS

BACKGROUND OF THE INVENTION

The invention pertains to the art of product manufacturing and, more specifically, to the separating of adjacent products adhered to each other due to the sticky nature of the products being produced. Although applicable to the production of a wide range of products, the invention has particular applicability in the manufacturing and packaging of products which are rolled or coiled and have a tendency to become conjoined and, more particularly, to sticky food products which are rolled or coiled on a support or peel strip.

In the field of product manufacturing, there exist many products which are sticky, either by nature or due to the application of an adhesive. In many instances, these types of products are provided on a support or peel strip which, when the product is rolled, establishes a barrier between successive layers of the sticky product. During the manufacturing process where it is desired to mass produce such products at a high production rate, it is not uncommon for adjacent product to adhere to each other. If this situation is not remedied, the conjoined products could create issues with downstream production and/or packaging operations. Often, the solution to this problem is to slow down the production rate so that the produced products are amply spaced from one another to avoid contact. Of course, in the competitive manufacturing field, slowing down production is not desirable.

One manufacturing area which experiences the issues of concern is in the food art where there are numerous sticky food products produced in rolled form on a support strip. By way of example, it is known to manufacture chewing gum and fruit-based snack products such as FRUIT BY THE FOOT™. In each of these examples, it is known to wind multiple rolls at one time, sometimes resulting in one roll being wound into the next roll or adjacent rolls adhering, creating conjoined products which can result in production stoppage due to jamming or the like issues as the conjoined products travel toward a packaging line.

SUMMARY OF THE INVENTION

The present invention is directed to providing a product separating apparatus for quality control purposes in a manufacturing line for the production of sticky products, including sticky products in roll form, wherein the apparatus is effectively positioned following a product assembly operation and functions to assure that adjacent products are not conjoined as the products proceed toward a packaging operation. In accordance with the invention, the separating apparatus includes a holding mechanism and a breaking mechanism. During production, the sticky products are directed to the apparatus whereat any conjoined products are automatically separated, with the holding mechanism maintaining a first or trailing one of the conjoined products in a first orientation while the breaking mechanism forces a second or leading one of the conjoined products to be reorientated, basically pivoting the second conjoined product relative to the first product, which results in the conjoined products being broken apart.

In accordance with an embodiment of the invention, each of the holding and breaking mechanisms include one or more wheels mounted for rotation about respective axes, with the wheels engaging the sticky products as the products pass beneath the apparatus. The wheels can be mounted for vertical movement relative to the sticky products to assure sufficient product engagement during operation. In a preferred form of the invention, the apparatus is positioned to separate conjoined, sticky rolled food products at a transfer region of the products from an upper conveyor to a lower conveyor.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
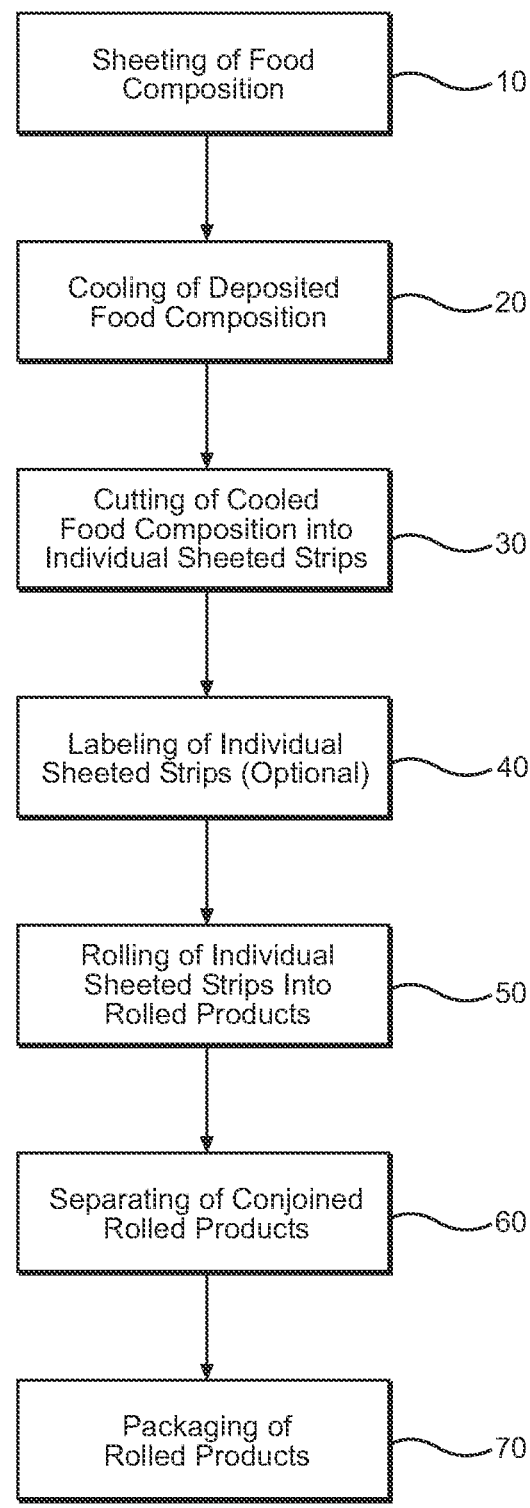
FIG. 1 is a flow chart illustrating stages in the production of a sticky, rolled food product in accordance with the present invention.

By way of example, FIG. 1 will be initially referenced in describing various stages in the continuous production of sticky, rolled food products made utilizing the apparatus of the invention. For purposes of this exemplary use of the invention, reference will be particularly made to the production of fruit-based rolled food products but, as mentioned above, the invention has wide use in connection with the production of a wide range of sticky products. For purposes of this description, it is assumed that the sticky composition has already been made such that the first illustrated production step is the sheeting of the food composition at 10. Next, the sheeted food composition is cooled at 20 and cut into individual sheeted strips in step 30. If desired, labeling can be applied to the individual sheeted strips at 40. Next, the sheeted strips are rolled into rolled products at 50 and any conjoined products are separated at 60 prior to being packaged at 70. At this point, it should be recognized that the invention is particularly concerned with separating step 60 discussed above. In fact, aside from this step, the remaining general production steps for the production of fruit-based rolled food products is known in the art, such as from U.S. Pat. No. 5,455,053 which is incorporated herein in its entirety.

Figure 2:
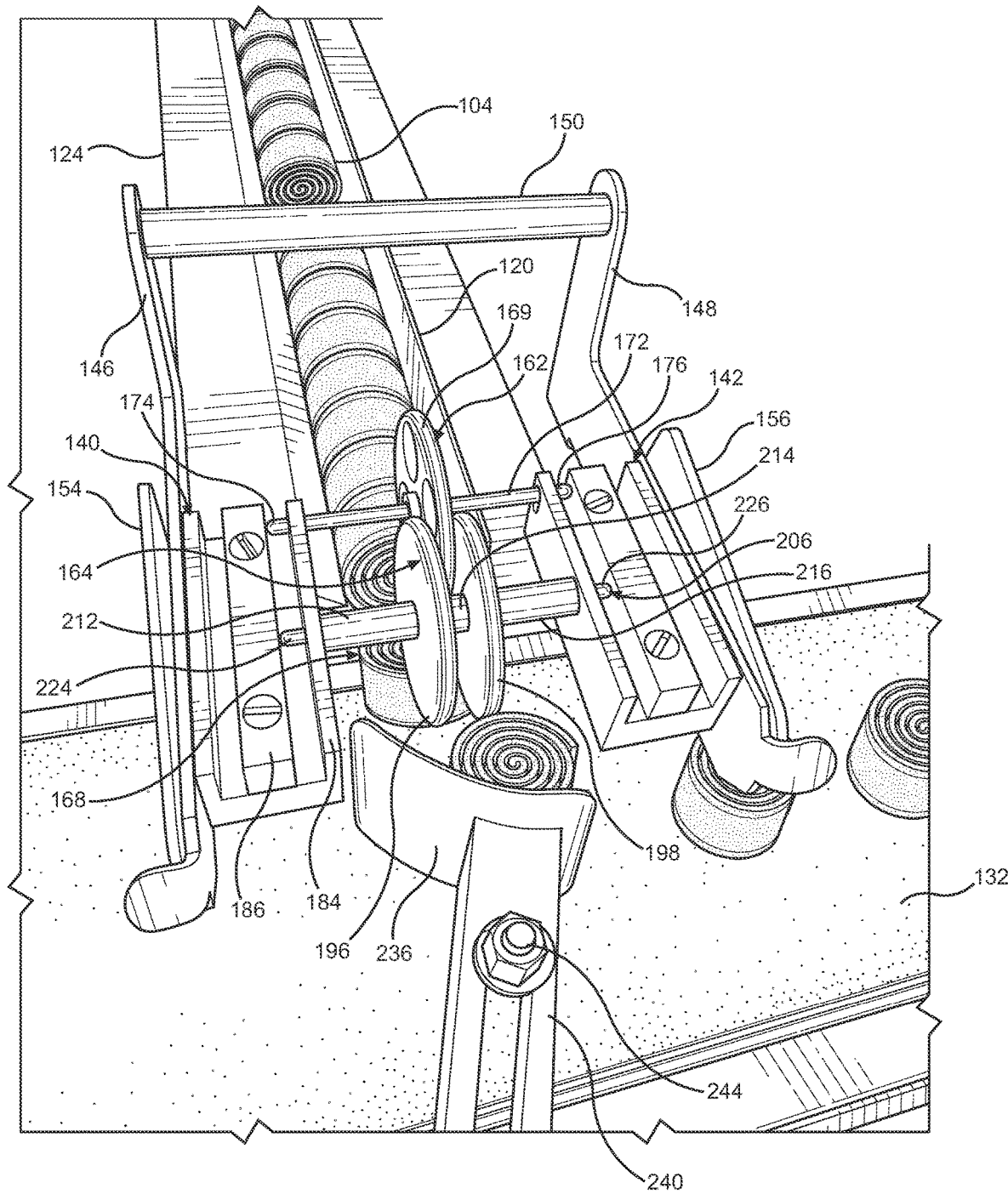
FIG. 2 is a perspective view showing the apparatus of the invention operating to separate conjoined rolled food products.

Reference will now be made to FIG. 2 in which the apparatus for separating conjoined products in accordance with the invention is shown. A series of rolled products 104 travel along a first conveyor 114 (shown in FIGS. 3 and 4). In the case of a fruit-based rolled food product, each rolled product 104 would include a spirally wound fruit paste composition, with layers of the composition being spaced by a support sheet as established after step 50 discussed above. As shown, rolled products 104 are laterally constrained between an upstanding sidewall 120 and a side plate 124. Although not detailed in the figure, one or more of upstanding sidewall 120 and side plate 124 can be adjustable to accommodate different width products. In any case, rolled products 104 are directed along first conveyor 114 towards a second conveyor 132 which is shown to be arranged substantially perpendicular to first conveyor 114. At the juncture of first and second conveyors 114 and 132 is a product separating apparatus as detailed below.

In the exemplary embodiment depicted, the separating apparatus includes a pair of spaced mounting blocks 140 and 142 sandwiched between laterally spaced support arms 146 and 148 which, in turn, are interconnected by a cross bar 150. The separating apparatus also includes outer mounting plates 154 and 156, as well as a holding mechanism 162 and a breaking mechanism 164 both of which are provided within a transfer region generally indicated at 168. In the embodiment depicted, holding mechanism 162 includes a first member 169 which is shown constituted by a wheel mounted for rotation on a shaft 172 having opposing ends 174 and 176. In connection with the mounting of shaft 172, each mounting block 140, 142 includes an upstanding wall 184 and a central block 142 for supporting and retaining shaft 172 as will be detailed further below.

As shown, breaking mechanism 164 includes a pair of spaced second members 196 and 198 which straddle first member 169. More specifically, second and third members 196 and 198 also preferably constitute rotatable members or wheels, with first member 169 extending partially between second and third members 196 and 198. Second and third members 196 and 198 are mounted on a common shaft 206 with associated spacers 232, 234 and 236 maintaining a desired alignment, while ends 224 and 226 of shaft 206 are supported by the upstanding walls 184 of mounting blocks 140 and 142, respectively. Due to the redirecting on rolled products 104 from first conveyor 114 to second conveyor 132, an angled or arcuate element 236 is provided to redirect rolled products 104 onto second conveyor 132, with redirecting element 236 being shown to include an adjustable mounting arm 240 which can be fixed in a desired position with a fastener 244.

Figure 3:
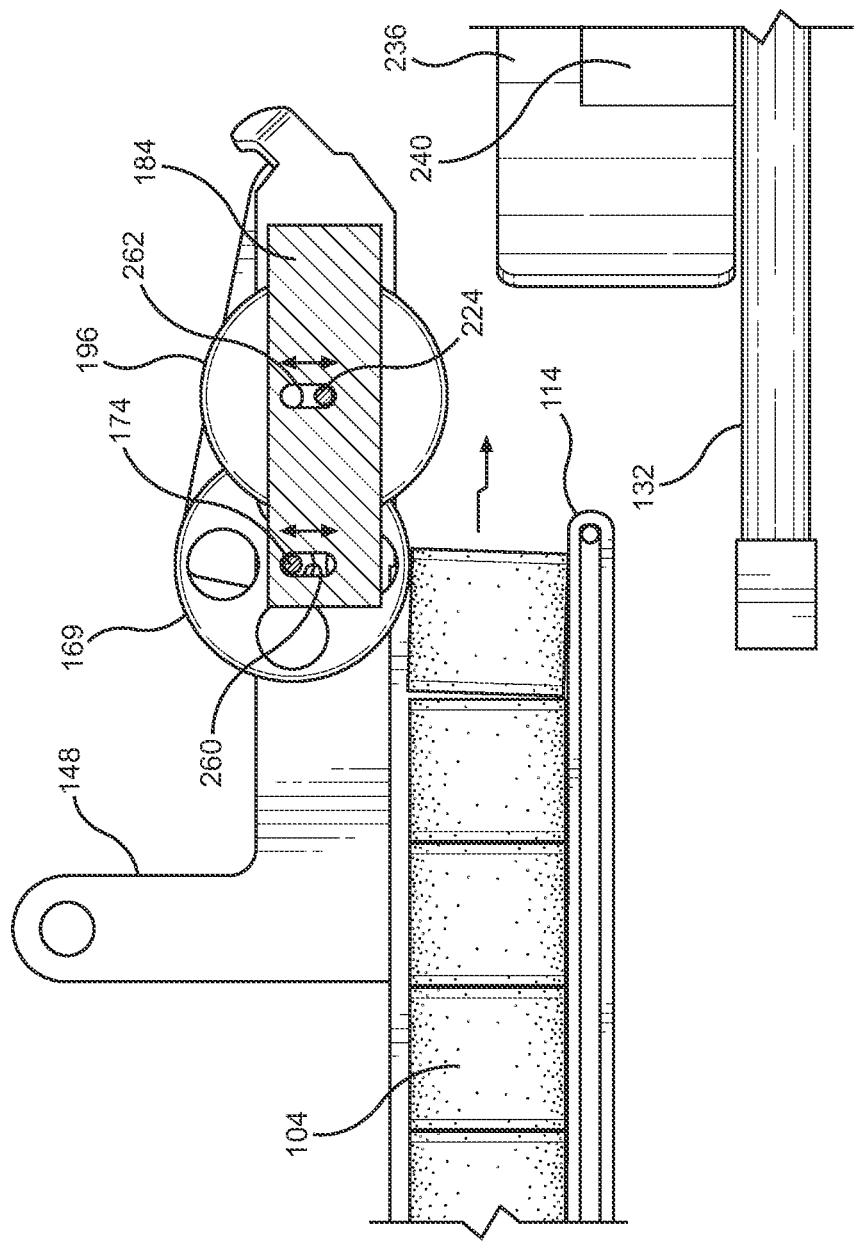
FIG. 3 is a side view of the apparatus of FIG. 2 in an initial stage of operation.
Figure 4:
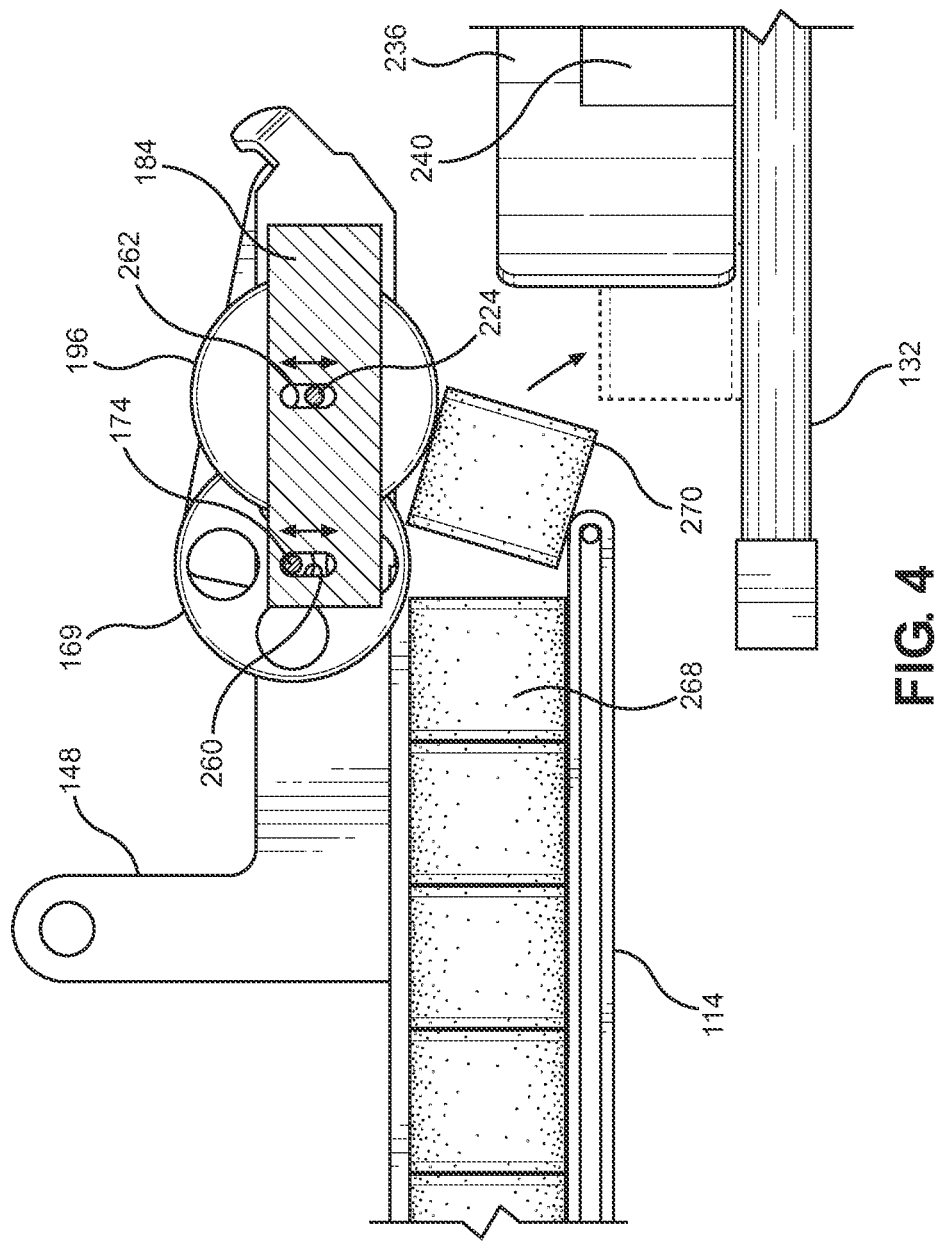
FIG. 4 is a side view of the apparatus, similar to FIG. 3 but showing the apparatus in a later stage of operation.

As indicated in FIG. 2 but best shown in FIGS. 3 and 4 with reference to upstanding plate 184, each mounting block 140, 142 includes openings in the form of slots 260 and 262 having at least vertical components and through which extend respective ends of shafts 172 and 206, i.e., end 174 of shaft 172 extends through slot 260 in upstanding plate 184, while end 224 of shaft 206 extends through slot 262. Again, it should be understood that a corresponding slotted mounting arrangement is provided for ends 176 and 226 of shafts 172 and 206 in the analogous upstanding plate of mounting block 142. With this construction, first member 169, as well as second and third members 196 and 198, can shift vertically relative to rolled products 104. At the same time, ends 174, 176, 224 and 226 are restricted against lateral movement due to the positioning of central blocks 186, thereby constraining first, second and third members 169, 196 and 198 for the desired relative rotational and vertical movement.

As indicated above, the present invention can be employed in connection with separating a wide range of conjoined, sticky products in a production line. However, in further detailing the invention, continued reference will be made to the embodiment concerning the production of fruit-based rolled food products which has been known to deal with the undesirable development of adjacent rolled products either winding into the next roll, adhering to each other or otherwise being conjoined. These conjoined products can cause production stoppages and equipment/product jamming as the products continue down the food production line towards a packaging stage. However, in accordance with the invention, the combination of holding mechanism 162 and breaking mechanism 164 effectively and automatically, physically separates any conjoined products. In the preferred embodiment shown, this separation operation is performed in transfer region 168 wherein the separated products are reoriented and redirected from upon first or upper conveyor 114 onto second or lower conveyor 132. In general, holding mechanism 162 is configured to hold a first or trailing conjoined product while breaking mechanism 164 separates a second or leading conjoined product from the first product as will now be described in detail with particular reference to FIGS. 3 and 4.

Initially, with reference to FIG. 3, it can be seen how first member or wheel 169 can shift vertically and ride along, i.e., rotates upon coming into contact with, the individual products 104 as they approach second conveyor 132. At the same time, it should be noted that each of the second and third members or wheels 196 and 198 is at a lower vertical position as there is no product being engaged by the second and third members 196 and 198. However, as the line of rolled products 104 continue along first conveyor 114, if two adjacent products, such as products 268 and 270 of FIG. 4, were conjoined due to product production or just the sticky nature of the products, first member 169 will become positioned atop product 268 above first conveyor 114 at the same time second and third members 196 and 198 are atop product 270 (note here the distance between shafts 172 and 206 are set based on product length). However, second and third members 196 and 198 are not directly above first conveyor 114, i.e., shaft 206 is located downstream of the end of first conveyor 114 and above second conveyor 132, such that engagement of second and third members 196 and 198 will force second product 270 to be reoriented relative to first product 268, i.e., pivoted and flipped so as to be broken away from the held first product 268. Therefore, holding mechanism 162 of the overall separating apparatus automatically engages and holds first conjoined, sticky product 268 as product 268 reaches the separating apparatus, while breaking mechanism 164 forces second conjoined, sticky product 270 to be reorientated and broken away from first conjoined, sticky product 268, with second and third members 196 and 198 being in initial rotating engagement with and then shifting in the vertical direction in separating second, sticky product 270 from first, sticky product 268. With second conveyor 132 being located lower than first conveyor 114, second product 270 is deposited, i.e., caused to drop, onto second conveyor 132 and redirected by element 236 for travel to a packaging stage represented by step 70 of FIG. 1. Of course, this separation operation continues automatically whenever adjacent products are conjoined. However, adjacent products which are not conjoined are also readily transferred to second conveyor 132. In this manner, the separation apparatus does not interfere with the continuous product production operation.

Based on the above, it should be readily apparent that the present invention provides an apparatus which can readily be incorporated into a continuous production process for sticky products and operates to automatically assure that any conjoined products will be separated as desired for packaging and to prevent any downstream jamming or line stoppage issues. While certain preferred embodiments of the present invention have been set forth, it should be understood that various changes or modifications could be made without departing from the spirit of the present invention. For instance, although the detailed embodiment employs wheels in the holding and breaking mechanisms, other structure, such as cammed plates or other members, could be utilized to perform the corresponding functions. In addition, in the embodiments tested, the weight of the wheels themselves were found to appropriately established the requisite holding and breaking forces. However, depending on the products being separated, weighted members or member biasing arrangements could be employed. Preferably the separating apparatus is constructed and mounted as a unit but, given the overall construction of the separating apparatus, it has been found quite easy to install and/or remove the apparatus, utilizing the cross bar as a handle. In general, the invention is only intended to be limited by the scope of the following claims.

The invention claimed is:

1. A method of separating first and second conjoined, sticky products during production comprising:
   directing sticky products along a first conveyor to a separating apparatus; and
   employing a holding mechanism of the separating apparatus to hold the first conjoined, sticky product while a breaking mechanism of the separating apparatus forces the second conjoined, sticky product to be reorientated and broken away from the first conjoined, sticky product;
   the breaking mechanism including a second member;
   wherein the second member shifts in a vertical direction in separating the first and second conjoined, sticky products.

2. The method of claim 1, wherein the holding mechanism includes a first member automatically coming into contact with the first conjoined, sticky product to hold down the first conjoined, sticky product as the first conjoined, sticky product reaches the separating apparatus on the first conveyor.

3. The method of claim 2, wherein the first member shifts in a vertical direction upon coming into contact with the first conjoined, sticky product.

4. The method of claim 3, wherein the first member rotates upon coming into contact with the first conjoined, sticky product.

5. The method of claim 1, wherein the second member automatically coming into contact with the second conjoined, sticky product while the first member of the holding mechanism is holding down the first conjoined, sticky product.

6. The method of claim 1, wherein the second member rotates upon coming into contact with the second conjoined, sticky product.

7. The method of claim 1, wherein each of the first and second conjoined, sticky products are rolled products.

8. The method of claim 7, wherein each of the first and second conjoined, sticky products are rolled food products.

9. The method of claim 1, further comprising depositing the second conjoined, sticky product onto a second conveyor upon breaking the second conjoined, sticky product from the first conjoined, sticky product.

10. The method of claim 9, wherein the second conveyor is located below a level of the first conveyor such that the second conjoined, sticky product drops from the first conveyor onto the second conveyor.

11. A production line for separating first and second conjoined, sticky products comprising:
    a first conveyor configured to transport the first and second conjoined, sticky products to a transfer region;
    a holding mechanism including a first member configured to hold the first conjoined, sticky product at the transfer region; and
    a breaking mechanism including a second member configured to engage the second conjoined, sticky product and force the second conjoined, sticky product to be reorientated and broken away from the first conjoined, sticky product while the holding mechanism is holding the first conjoined, sticky product at the transfer region;
    wherein the second member is mounted for movement in the vertical direction while separating the second conjoined, sticky product.

12. The production line of claim 11, wherein the first member is mounted for movement in a vertical direction relative to the first conjoined, sticky product.

13. The production line of claim 12, wherein the first member is mounted from rotational movement.

14. The production line of claim 11, wherein the second member of the breaking mechanism is configured to automatically come into contact with the second conjoined, sticky product while the first member of the holding mechanism is holding down the first conjoined, sticky product.

15. The production line of claim 11, wherein the second member is configured to rotate upon coming into contact with the second conjoined, sticky product.

16. The production line of claim 11, wherein each of the first and second conjoined, sticky products are rolled products.

17. The production line of claim 16, wherein each of the first and second conjoined, sticky products are rolled food products.

18. The production line of claim 11, further comprising a second conveyor located below a level of the first conveyor at the transfer region, wherein the second member is configured to cause the second conjoined, sticky product to be transferred onto the second conveyor upon breaking the second conjoined, sticky product from the first conjoined, sticky product.

* * * * *